US008705972B2

(12) United States Patent
McLaren et al.

(10) Patent No.: US 8,705,972 B2
(45) Date of Patent: Apr. 22, 2014

(54) ENERGY-EFFICIENT AND FAULT-TOLERANT RESONATOR-BASED MODULATION AND WAVELENGTH DIVISION MULTIPLEXING SYSTEMS

(75) Inventors: Moray McLaren, Bristol (GB); Nathan Lorenzo Binkert, Redwood City, CA (US); Alan Lynn Davis, Coalville, UT (US); Marco Florentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 12/777,500

(22) Filed: May 11, 2010

(65) Prior Publication Data

US 2011/0280579 A1 Nov. 17, 2011

(51) Int. Cl.
*H04J 14/02* (2006.01)
*H04B 14/04* (2006.01)
*H04B 10/00* (2013.01)
*H04B 10/12* (2011.01)
*G02B 6/12* (2006.01)
*G02B 6/28* (2006.01)
*G02F 1/01* (2006.01)

(52) U.S. Cl.
USPC ............ 398/79; 398/183; 398/139; 398/141; 398/200; 385/14; 385/24; 385/1

(58) Field of Classification Search
CPC .... G02B 6/4214; G02B 6/12007; G02B 6/42; G02B 6/2938; G02B 6/29395; G02F 1/025; H04B 10/505; H04J 14/02
USPC ........................... 398/79, 183; 385/14, 183, 1
See application file for complete search history.

(56) References Cited

U.S. PATENT DOCUMENTS

| 4,860,279 | A | * | 8/1989 | Falk et al. | 398/43 |
| 5,226,100 | A | * | 7/1993 | Maerz | 385/45 |
| 5,233,453 | A | * | 8/1993 | Sivarajan et al. | 398/55 |
| 5,331,451 | A | * | 7/1994 | Mozer | 398/98 |
| 5,394,489 | A | * | 2/1995 | Koch | 385/14 |
| 5,440,416 | A | * | 8/1995 | Cohen et al. | 398/82 |
| 5,444,725 | A | * | 8/1995 | Zirngibl | 372/20 |
| 5,457,760 | A | * | 10/1995 | Mizrahi | 385/37 |
| 5,889,898 | A | * | 3/1999 | Koren et al. | 385/9 |
| 6,014,237 | A | * | 1/2000 | Abeles et al. | 398/87 |
| 6,167,169 | A | * | 12/2000 | Brinkman et al. | 385/4 |
| 6,320,693 | B1 | * | 11/2001 | Cereo et al. | 359/337 |
| 6,324,204 | B1 | * | 11/2001 | Deacon | 372/96 |
| 6,490,044 | B1 | * | 12/2002 | Koch et al. | 356/478 |
| 6,606,336 | B2 | * | 8/2003 | Matsumoto | 372/45.01 |
| 6,785,447 | B2 | * | 8/2004 | Yoshimura et al. | 385/42 |
| 7,016,608 | B1 | * | 3/2006 | Ball et al. | 398/71 |
| 7,103,277 | B2 | * | 9/2006 | Ridgway | 398/72 |

(Continued)

*Primary Examiner* — Ken Vanderpuye
*Assistant Examiner* — Abbas H Alagheband

(57) ABSTRACT

Systems and methods are provided for modulating, channels in dense wavelength division multiplexing ("DWDM") systems. In one aspect, a modulation and wavelength division multiplexing system includes a channel source and a waveguide tree structure disposed on a substrate. The tree structure includes waveguides branching from a root waveguide. The waveguides include two or more terminus waveguides coupled to the channel source. The system also includes one or more modulator arrays disposed on the substrate. Each modulator array is optically coupled to one of the two or more terminus waveguides and is configured to modulate channels injected into a terminus waveguide from the channel source to produce corresponding optical signals that propagate from the terminus waveguide along one or more of the waveguides to the root waveguide.

20 Claims, 12 Drawing Sheets

(56) References Cited

U.S. PATENT DOCUMENTS

| | | | |
|---|---|---|---|
| 7,123,793 B2 * | 10/2006 | Ridgway | 385/37 |
| 7,145,710 B2 * | 12/2006 | Holmes | 359/279 |
| 7,257,283 B1 * | 8/2007 | Liu et al. | 385/14 |
| 7,539,418 B1 * | 5/2009 | Krishnamoorthy et al. | 398/82 |
| 7,542,641 B1 * | 6/2009 | Asghari et al. | 385/39 |
| 7,636,522 B2 * | 12/2009 | Nagarajan et al. | 398/79 |
| 7,869,668 B2 * | 1/2011 | Hashimoto et al. | 385/1 |
| 8,027,587 B1 * | 9/2011 | Watts | 398/79 |
| 8,068,706 B2 * | 11/2011 | Popovic et al. | 385/28 |
| 8,463,088 B1 * | 6/2013 | Asghari et al. | 385/14 |
| 2001/0010739 A1 * | 8/2001 | Takiguchi et al. | 385/15 |
| 2001/0041025 A1 * | 11/2001 | Farahi | 385/14 |
| 2002/0018507 A1 * | 2/2002 | Deacon | 372/96 |
| 2002/0064201 A1 * | 5/2002 | Matsumoto | 372/50 |
| 2002/0097962 A1 * | 7/2002 | Yoshimura et al. | 385/50 |
| 2002/0154856 A1 * | 10/2002 | Bacque et al. | 385/24 |
| 2002/0159686 A1 * | 10/2002 | Madsen | 385/24 |
| 2003/0165173 A1 * | 9/2003 | Helbing et al. | 372/50 |
| 2004/0056243 A1 * | 3/2004 | Atanackovic et al. | 257/19 |
| 2004/0105476 A1 * | 6/2004 | Wasserbauer | 372/50 |
| 2004/0114867 A1 * | 6/2004 | Nielsen et al. | 385/40 |
| 2004/0145708 A1 * | 7/2004 | Tanner et al. | 353/94 |
| 2005/0053324 A1 * | 3/2005 | Ridgway | 385/23 |
| 2005/0158050 A1 * | 7/2005 | Ridgway | 398/79 |
| 2006/0008272 A1 * | 1/2006 | Abeles | 398/48 |
| 2006/0198416 A1 * | 9/2006 | Yamazaki | 372/94 |
| 2006/0232848 A1 * | 10/2006 | Xu et al. | 359/325 |
| 2007/0110442 A1 * | 5/2007 | Peer | 398/78 |
| 2007/0116410 A1 * | 5/2007 | Kwakernaak | 385/39 |
| 2007/0280309 A1 * | 12/2007 | Liu | 372/26 |
| 2007/0292142 A1 * | 12/2007 | Hashimoto et al. | 398/186 |
| 2008/0166095 A1 * | 7/2008 | Popovic et al. | 385/126 |
| 2008/0310470 A1 * | 12/2008 | Ooi et al. | 372/44.01 |
| 2009/0103850 A1 * | 4/2009 | Shastri et al. | 385/3 |
| 2009/0269069 A1 * | 10/2009 | Mahgerefteh et al. | 398/82 |
| 2010/0091990 A1 * | 4/2010 | Etemad et al. | 380/256 |
| 2010/0098372 A1 * | 4/2010 | Manipatruni et al. | 385/2 |
| 2010/0166424 A1 * | 7/2010 | Nagarajan et al. | 398/79 |
| 2010/0183309 A1 * | 7/2010 | Etemad et al. | 398/79 |
| 2010/0226657 A1 * | 9/2010 | Raymond et al. | 398/141 |
| 2010/0329685 A1 * | 12/2010 | Zheng et al. | 398/83 |
| 2011/0274438 A1 * | 11/2011 | Fiorentino et al. | 398/141 |
| 2011/0280579 A1 * | 11/2011 | McLaren et al. | 398/79 |

* cited by examiner

ENERGY-EFFICIENT AND FAULT-TOLERANT RESONATOR-BASED MODULATION AND WAVELENGTH DIVISION MULTIPLEXING SYSTEMS

TECHNICAL FIELD

The disclosure relates to optical communication systems.

BACKGROUND

In the optical communications space, various techniques are used to synthesize optical communications signal for transmission. The term "optical" refers to electromagnetic radiation in both the visible and non-visible portions of the electromagnetic spectrum. An optical signal encodes information in high and low amplitude states or phase changes of a channel of electromagnetic radiation. A term "channel" refers to a single wavelength of electromagnetic radiation or a narrow band of electromagnetic radiation centered about a particular wavelength. For example, a high amplitude portion of an optical signal can represent a logic bit value "1" and a low amplitude portion of the same optical signal can represent a logic bit value "0," or vice versa. The optical signal can be transmitted over a waveguide, such as an optical fiber, or over free space.

Direct and indirect modulation are two processes by which optical signals can be generated. With direct modulation, the drive current of an electromagnetic radiation emitting device is modulated, such as modulating the drive current of a laser or a light-emitting diode ("LED"). Unfortunately, direct modulation of radiation emitting devices has a number of drawbacks. One problem with direct modulation is that the optical power source must be built in the same technology as the modulators. Cost-effective modulators typically need to be built in silicon and silicon is an indirect band-gap material. Hence, the power of silicon lasers is fundamentally limited which limits their utility to very short distances. In addition, direct modulation can shift the output wavelength of an optical signal, an effect called "chirp," which adds to chromatic dispersion.

Indirect modulation, on the other hand, is performed with two separate component types: 1) an unmodulated optical power source channel and 2) a modulator which selectively couples a portion of the optical power source energy to a modulated data channel, or selectively removes the light from the optical power source to encode the data. The selective coupling or removal modulator functionality provides a simple on-off keying data encoding mechanism. Indirect modulation allows both the optical power source and the modulators to be built with separate technologies that is most efficient for its intended purpose. Indirect modulators typically provide faster modulation rates than direct modulation and typically do not alter the wavelength of the modulated optical signal.

Whether the optical signals are produced using direct or indirect modulation, wavelength division multiplexing is typically used to combine multiple optical signals for transmission along a single waveguide. However, in recent years, the demand for fast and energy-efficient modulation and wavelength division multiplexing systems has increased in order to keep pace with the increasing demand for high-speed data transmission between communicating devices.

DETAILED DESCRIPTION

Figure 1A:
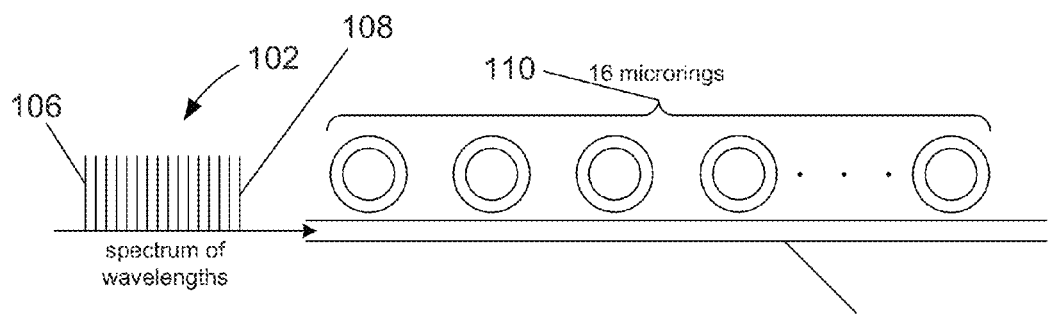
FIG. 1A shows an array of microring resonators located along a single waveguide.

Disclosed herein are systems and methods for modulating channels in dense wavelength division multiplexing ("DWDM") systems. System examples avoid interference between modulators of a dense wavelength division modulator array and provide a power savings. For example, consider 16 microring resonators of a dense wavelength division modulator array shown in FIG. 1A. A light source, such as a comb laser, produces a spectrum of 16 wavelengths 102 that are injected into a waveguide 104, with vertical line segments representing the 16 different wavelengths of the spectrum arranged from the shortest wavelength 106 to the longest wavelength 108. The wavelengths 102 are transmitted past an array of 16 microring resonators 110, each resonator configured to modulate one of the 16 wavelengths. For example, resonator 112 can be configured and operated to modulate the wavelength 106. All of the resonators 110 must kept on resonance with each associated wavelength by controlling the temperature of the resonators. In order to shift a resonator in and out of resonance (i.e., modulate an optical signal), charge is injected into the resonator in order to change the resonator's relative index of refraction. Even when one or more of the resonators are not being used for modulation, they must be kept thermally tuned to avoid interfering with each other. For example, if the temperature of the resonator 112 is not maintained, its resonance may shift to substantially match the resonance of another resonator, such as resonator 114, enabling the resonator 112 to interfere with the resonator 114 modulating its associated wavelength 116. If this is the case, the entire resonator array 110 may be rendered useless. In addition, because the temperature of all the modulators must be accurately maintain at all times during operation, even when resonators are not in use, thermal tuning becomes a significant part of the overall power budget.

Figure 1B:
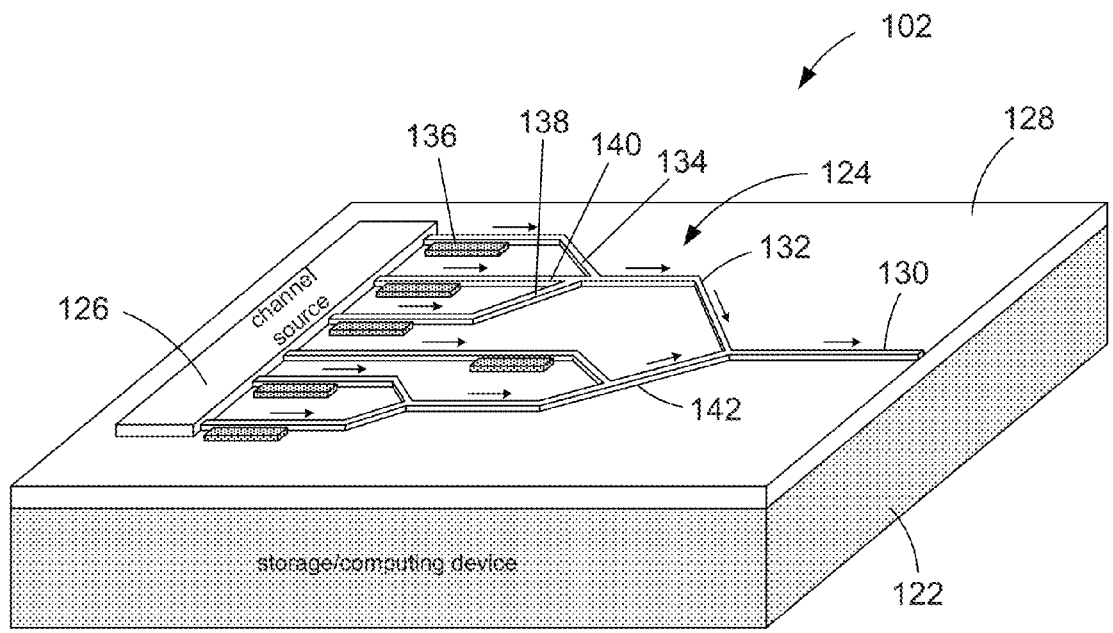
FIG. 1B shows an isometric view of an example modulation and wavelength division multiplexing system disposed on a surface of a storage/computing device in accordance with one or more embodiments of the present invention.

Other interference failures may be caused by insufficient manufacturing precision or due to a persistent circuit failure. The inherent resonance frequency of a microring is fundamentally influenced by it's geometric properties. A failure to meet the intended manufacturing tolerances can result in a substantial shift in the ring's resonant frequency which cannot be overcome with thermal tuning and hence it may interfere with the resonant frequencies of other microrings in the same group 110 and 136. If either the charge injection circuitry or the heater circuitry fails then a similar problem occurs. By partitioning rings into groups, the damage is limited to that group as illustrated in FIG. 1B. Interfering partitions can be powered down to save energy since they do not interfere with other operational partitions.

This same partitioning strategy can also be employed for another purpose. Namely if the system bandwidth need can be satisfied by a subset of the operational partitions then only that subset needs to be thermally tuned. The unused partitions can be brought into operational status when more bandwidth is required, or currently operational partitions can be disabled when system bandwidth requirements are reduced. Hence partitioned microring structures support both fault-tolerance and energy efficiency.

System examples partition the modulator array enabling thermal tuning to be turned off for inactive resonators. In addition, by partitioning the modulator array, the modulators that might normally interfere in the modulator array shown in FIG. 1A can be located along different waveguides reducing the risk of any two resonators associated with closely spaced wavelengths from interfering with each other.

FIG. 1B shows an example modulation and WDM system 120 disposed on a surface of a storage/computing device 122. The system 120 includes a tree-like structure of branching waveguides ("waveguide tree structure") 124 and a channel source 126 disposed on a surface of a substrate 108. The waveguide tree structure 124 includes a root waveguide 130 and a number of branching waveguides 132 that ultimately terminate at the channel source 106. Branching waveguides, such as branching waveguide 134, that terminate at the channel source 126 are referred to as "terminus waveguides." The system 120 also includes six modulator arrays, represented by shaded boxes, such as shade box 136, disposed on the surface of the substrate 128 and located adjacent to the terminus waveguides. The channel source 126 generates a set of channels, each channel associated with a different wavelength denoted by λ. The channel source 126 is configured to inject a different subset of channels into each terminus waveguide. The storage/computing device 122 can be memory, a processor, a multicore processor, a router, and any other device for storing, routing, and/or processing data. As shown in the example of FIG. 1B, the waveguides of the waveguide tree structure 104 are ridge waveguides disposed on the surface of the substrate 108.

The storage/computing device 122 electronically and independently controls each modulator array in order to separately encode data in each channel. A channel that has been amplitude modulated to carry data is referred to as an optical signal. Wavelength division multiplexing of optical signals is accomplished by transmitting optical signals along the branching waveguides of the waveguide tree structure to the root waveguide 130, as indicated by directional arrows. For example, the channel source 126 injects a subset of channels into the terminus waveguide 134. The device 122 electronically operates the modulator array 136 to encode data into each of the channels injected into the waveguide 134. Each channel that passes through the modulator array 136 is converted into a corresponding optical signal. The optical signals propagate along the terminus waveguide 134 and are joined by two other optical signals that enter the waveguide 132 from terminus waveguides 138 and 140. The optical signals carried by the waveguide 132 are joined by the optical signals carried by the waveguide 142 upon entering the root waveguide 130.

Note that examples disclosed herein are not limited to the channel source 126 being located on the substrate 128. In other examples, the channel source 126 can be located on a different device.

Modulator arrays and various types of channel sources are now described with reference to example systems shown in FIGS. 2-14. Note that modulation and WDM system examples are not limited to the waveguide tree structure described below. The waveguide tree structure can be configured with any suitable number of branching and terminus waveguides.

Figure 2:
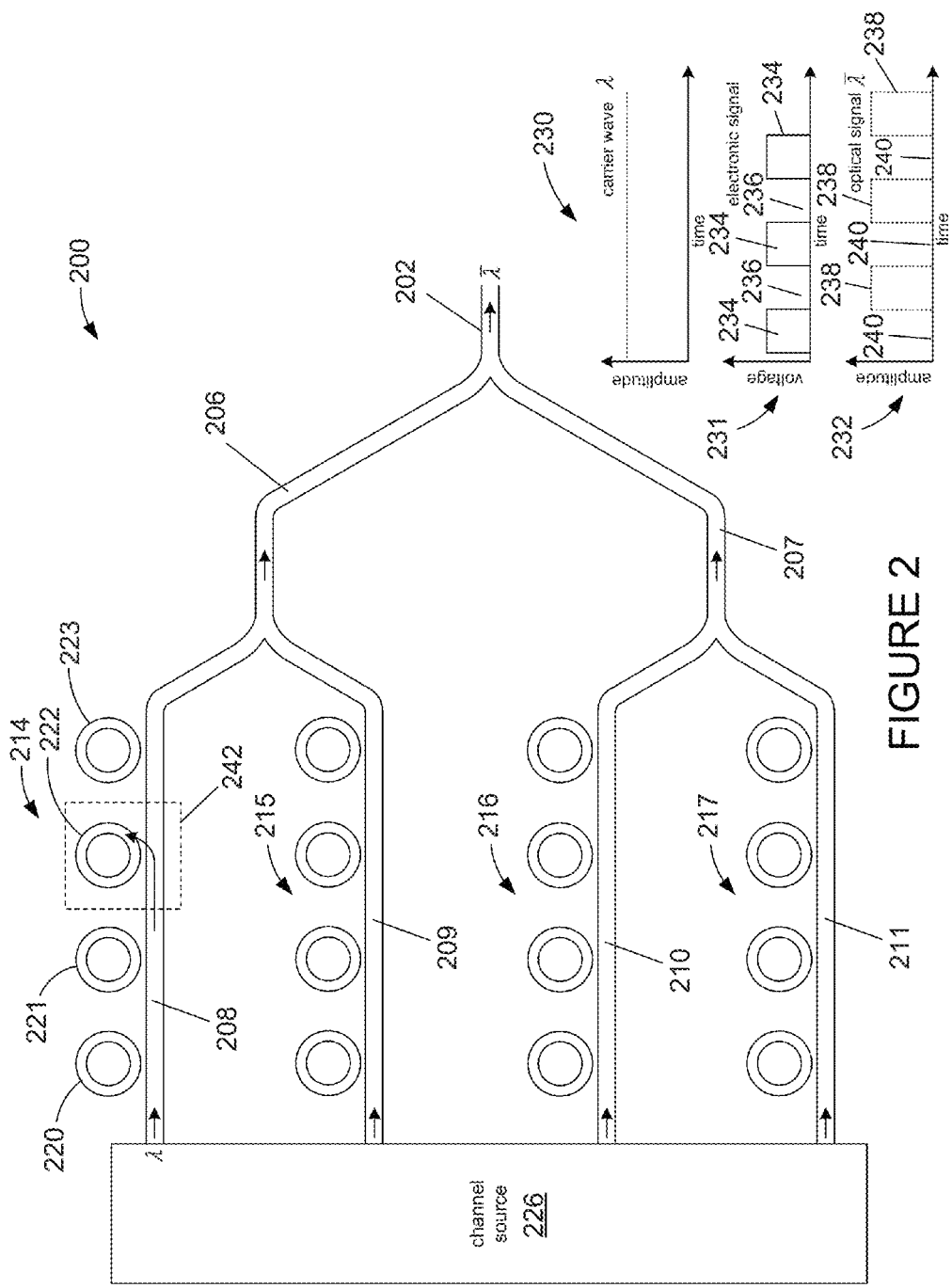
FIG. 2 shows a schematic representation of a first example modulation and wavelength division multiplexing system.

FIG. 2 shows a schematic representation of an example modulation and WDM system 200. The system 200 includes a waveguide tree structure composed of a root waveguide 202 that branches into waveguides 206 and 207. The waveguide 206 branches into terminus waveguides 208 and 209, and the waveguide 207 branches into terminus waveguides 210 and 211. The waveguides 202 and 206-211 are ridge waveguides disposed on a surface of a lower refractive index substrate. As shown in the example of FIG. 2, the system 200 includes modulator arrays 214-217 disposed along, and in close proximity to, each terminus waveguide. For example, the modulator array 214 includes mirroring resonators ("resonators") 220-223 disposed along terminus waveguide 208. The modulator arrays 214-217 from a partition of the mirroring resonators. The system 200 also includes a channel source 226 coupled to the ends of the terminus waveguides 208-211. The channel source 226 is configured to generate a set of unmodulated channels. Each channel within the set of channels has a different associated wavelength denoted by λ. The channel source 226 injects a different subset of channels into each terminus waveguide. The channels propagate along the branching waveguides to the root waveguide 202, as indicated by directional arrows. The resonators are electronically coupled to a processor, memory, router, data storage or computing device, as described above with reference to the system 100. Each resonator is configured to independently modulate the amplitude of a particular associated channel in order to produce an optical signal with the same associated wavelength denoted by $\bar{\lambda}$. WDM is performed by the optical signals propagating along the waveguides into the root waveguide 202.

FIG. 2 includes example time plots 230-232 of a channel, electronic signal, and optical signal, respectively. The time plots represent generating an optical signal from an electronic signal produced by a storage/computing, device. Amplitude versus time plot 230 represents a channel λ with a substantially constant amplitude injected into the terminus waveguide 208 by the channel source 226. Suppose, for example, the resonator 222 is configured to modulate the amplitude of the channel λ injected into the terminus waveguide 208. Voltage versus time plot 231 represents an electronic, signal comprising alternating high 234 and low 236 voltages applied to the resonator 222. A high voltage can represent a logic bit value "1" and a low or no voltage can represent a logic bit value "0," or vice versa. The resonator 222 can be configured and operated, as described in greater detail below, so that while a high voltage 234 is applied to the resonator 222, the resonator 222 is resonant with the wavelength λ such that the channel is evanescently coupled from the waveguide 208 into the resonator 222. While a low or no voltage 236 is applied, the resonator 222 is switched off resonance with the wavelength λ and the channel passes the resonator unperturbed. Amplitude versus time plot 232 represents alternating high 238 and low 240 amplitudes of an optical signal $\overline{\lambda}$ produced by evanescently coupling the channel λ into the resonator 222 during application of the electronic signal. Each high amplitude 238 portion of the optical signal corresponds to a low voltage 236 of the electronic signal, and each low amplitude portion 240 of the optical signal corresponds to a high voltage 234 of the electronic signal. A low or no amplitude portion 240 can represent a logic hit value "1" and a high amplitude portion 238 can represent a logic bit value "0." or vice versa. As shown in the example of FIG. 2, the optical signal $\overline{\lambda}$ is carried by the branching waveguides 208 and 206 to the root waveguide 202.

In other examples, as described in greater detail below, the resonators can be configured and operated so that while a high voltage is applied to a resonator, the resonator is not resonant with the wavelength λ and the channel passes the resonator unperturbed, and while a low or no voltage is applied to the resonator, the resonator is resonant with the wavelength λ and the channel is evanescently coupled from the waveguide into the resonator.

The resonators and ridge waveguides are composed of a material having a relatively higher refractive index than the substrate. For example, the resonators and waveguides can be composed of silicon ("Si") and the substrate can be composed of $SiO_2$ or another suitable lower refractive index material. The resonators and waveguides can be formed by first depositing a layer of higher refractive index material on lower refractive index material that serves as a substrate. The resonators and waveguides can be formed in the higher refractive index material using various well-known lithographic and/or etching techniques. For example, the resonators and waveguides can be formed using nanoimprint lithography or reactive ion etching.

Figure 3:
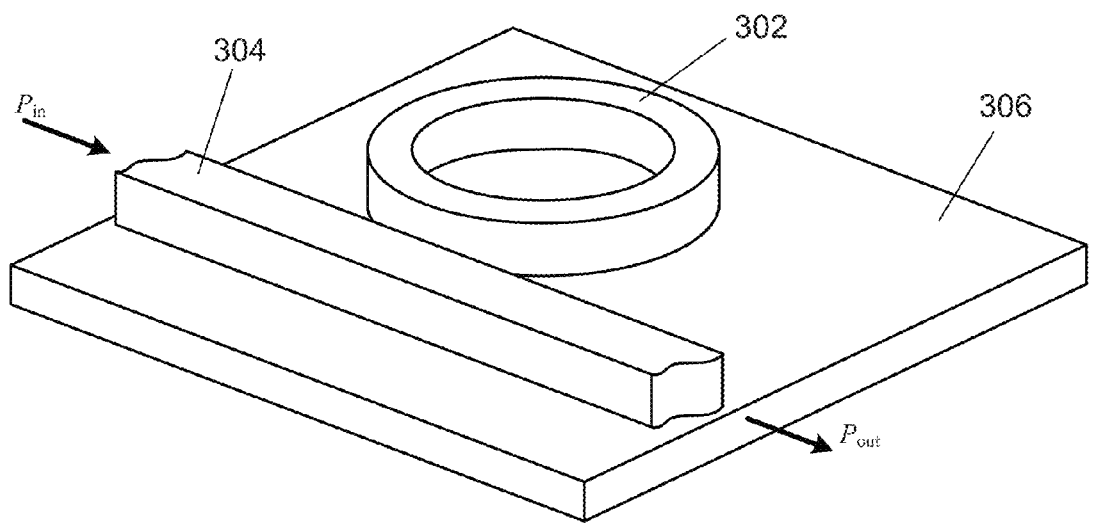
FIG. 3 shows an isometric view and enlargement of an example microring resonator and a portion of an adjacent ridge waveguide.

FIG. 3 shows an isometric view and enlargement of an example microring resonator 302 and a portion of an adjacent ridge waveguide 304 disposed on the surface of a substrate 306. For example, the resonator 302, waveguide 304 and substrate 306 can represent the resonator 222 and portion of terminus waveguide 208 identified by enclosure 242 shown in FIG. 2. A channel associated with a particular wavelength transmitted along the waveguide 304 is evanescently coupled from the waveguide 304 into the resonator 302 when the channel and the dimensions of the resonator 302 satisfy the resonance condition:

$$\frac{L}{m} \approx \frac{\lambda}{n_{\text{eff}}(\lambda, T)}$$

where $n_{\text{eff}}$ is the effective refractive index of the resonator 302, L is the effective optical path length of the resonator 302. m is an integer indicating the order of the resonance, and λ is the free-space wavelength of the channel traveling in the waveguide 304. The resonance condition can also be rewritten as $\lambda \approx Ln_{\text{eff}}(\lambda,T)/m$. In other words, the resonance wavelength for a resonator is a function of the resonator effective refractive index and optical path length.

Evanescent coupling is the process by which evanescent waves of light are transmitted from one medium, such as a resonator, to another medium, such a ridge waveguide, and vice versa. The term "light" refers to electromagnetic radiation with wavelengths in the visible and non-visible portions of the electromagnetic spectrum. For example, evanescent coupling between the resonator 302 and the waveguide 304 occurs when the evanescent field generated by light associated with a channel propagating in the waveguide 304 couples into the resonator 302. Assuming the resonator 302 is configured to support the modes of the evanescent field, the evanescent field gives rise to light that propagates in the resonator 302, thereby evanescently coupling the light or channel from the waveguide 104 into the resonator 302.

Figure 4:
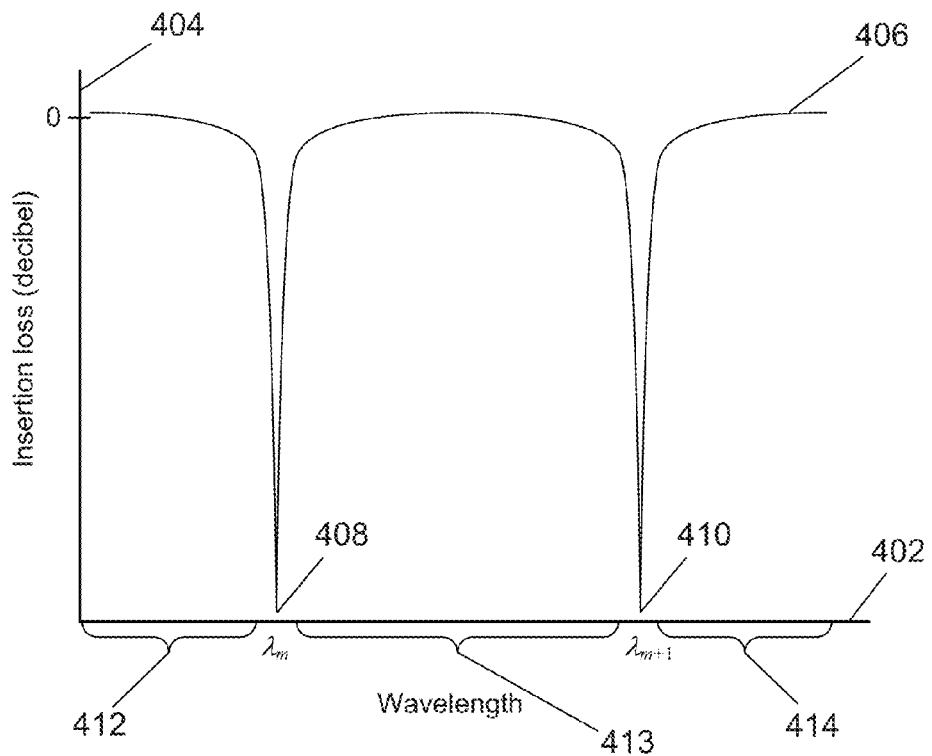
FIG. 4 shows a plot of insertion loss versus wavelength for a microring resonator.

FIG. 4 shows a plot of insertion loss versus wavelength for the resonator 302 and the waveguide 304 shown in FIG. 3. Insertion loss, also called attenuation, is the loss of optical power associated with a wavelength of light traveling in the waveguide 304 coupling into the resonator 302 and can be expressed as $10 \log_{10}(P_{in}/P_{out})$ in decibels ("dB"), where $P_{in}$ represents the optical power of light traveling in the waveguide 304 prior to reaching the resonator 302, and $P_{out}$ is the optical power of light that passes the resonator 302. In FIG. 4, horizontal axis 402 represents wavelength, vertical axis 404 represents insertion loss, and curve 406 represents the insertion loss of light associated with a channel passing the resonator 302 over a range of wavelengths. Minima 408 and 410 of the insertion loss curve 406 correspond to wavelengths $\lambda_m = Ln_{\text{eff}}/m$ and $\lambda_{m+1} = Ln_{\text{eff}}/(m+1)$, respectively. These wavelengths represent only two of many regularly spaced minima. Wavelengths of light satisfying the resonance condition above are said to have "resonance" with the resonator 302 and are evanescently coupled from the waveguide 304 into the resonator 302. In the narrow wavelength regions surrounding the wavelengths $\lambda_m$ and $\lambda_{m+1}$, the insertion loss curve 406 reveals a decrease in the insertion loss the farther wavelengths are away from the wavelengths $\lambda_m$ and $\lambda_{m+1}$. In other words, the strength of the resonance between the resonator 302 and light traveling in the waveguide 304 decreases the farther the wavelengths are away from $\lambda_m$ and $\lambda_{m+1}$, and thus, the amount of the light coupled from the waveguide 304 into the resonator 302 decreases the farther the wavelengths are away from $\lambda_m$ and $\lambda_{m+1}$. Light with wavelengths in the regions 412-414 pass the resonator 302 substantially undisturbed.

According to the resonance condition, because the resonance wavelength λ is a function of the optical path length L and the effective refractive index $n_{\text{eff}}$ changing the effective refractive index and/or the optical path length produces a corresponding change in the resonance wavelength of the resonator. The resonator's effective refractive index and the optical path length L can be changed by varying the resonator's temperature (i.e. thermal tuning). For thermal tuning, the resonance wavelength shift can be expressed as:

$$\Delta\lambda \approx \lambda \frac{\Delta n_{\text{eff}} \Delta L}{n_{\text{eff}} L}$$

where $\Delta n_{\text{eff}}$ is the change in the effective refractive index of the material comprising the resonator, and ΔL is the change in the optical path length of the resonator.

In addition, resonators can be composed of semiconductor materials that exhibit electro-optic behavior. The effective refractive index of an electro-optic material is changed when an electric field is applied or charge carriers are injected.

Thus, the resonance wavelength of a resonator can be electronically tuned by injecting current into the resonator (i.e. current tuning) or by applying a voltage to the resonator electro-optic tuning). For electronic tuning, the resonance wavelength shift can be expressed as:

$$\Delta\lambda \approx \lambda \frac{\Delta n_{\it eff}}{n_{\it eff}}$$

Figure 5:
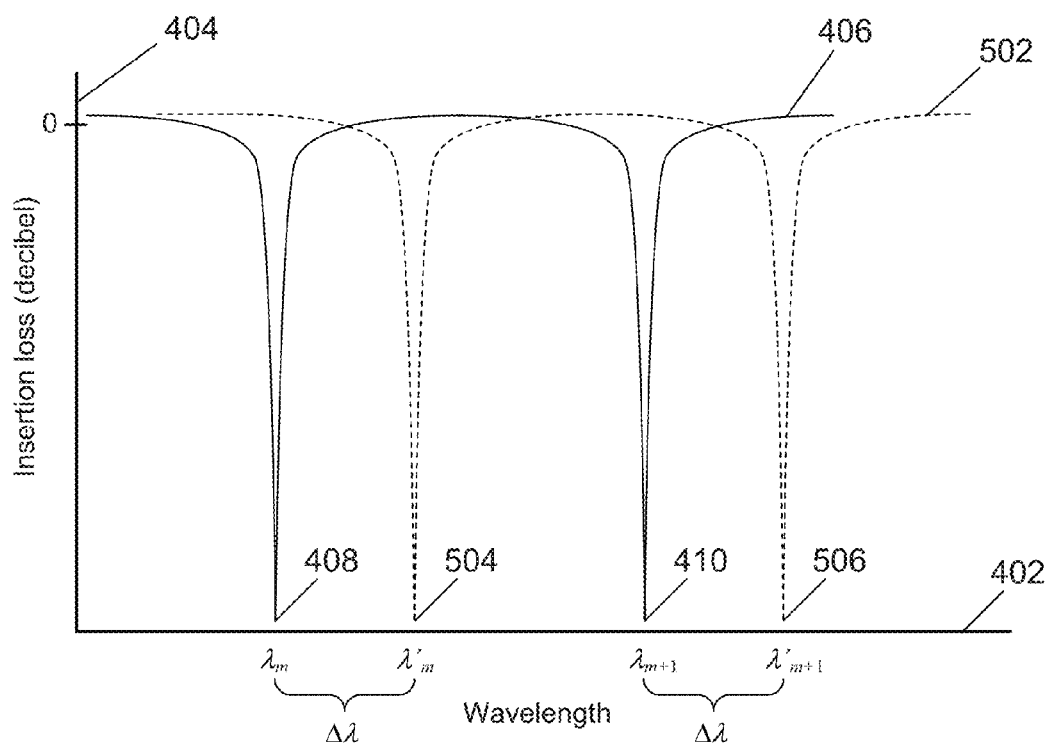
FIG. 5 shows a plot of insertion loss versus wavelength for a tunable microring resonator.

FIG. 5 shows a plot of insertion loss versus wavelength represented by dashed-line curve 502 for the resonator 302 and the waveguide 304, where the effective refractive index $n_{\it eff}$ and/or the optical path length L are changed as a result of temperature tuning or electronic tuning. Shifting the resonance wavelength of the resonator 302 by $\Delta\lambda$ shifts the insertion loss minima 408 and 410 associated with the wavelengths $\lambda_m$ and $\lambda_{m+1}$ to insertion loss minima 504 and 506 associated with the wavelengths and $\lambda_m'$ and $\lambda_{m+1}'$. Comparing curve 502 with curve 406 reveals that light with the wavelengths $\lambda_m$ and $\lambda_{m+1}$ is no longer evanescently coupled from the waveguide 304 into the resonator 302, but light with wavelengths $\lambda_m'$ and $\lambda_{m+1}'$ is evanescently coupled from the waveguide 304 into the resonator 102.

Figure 6:
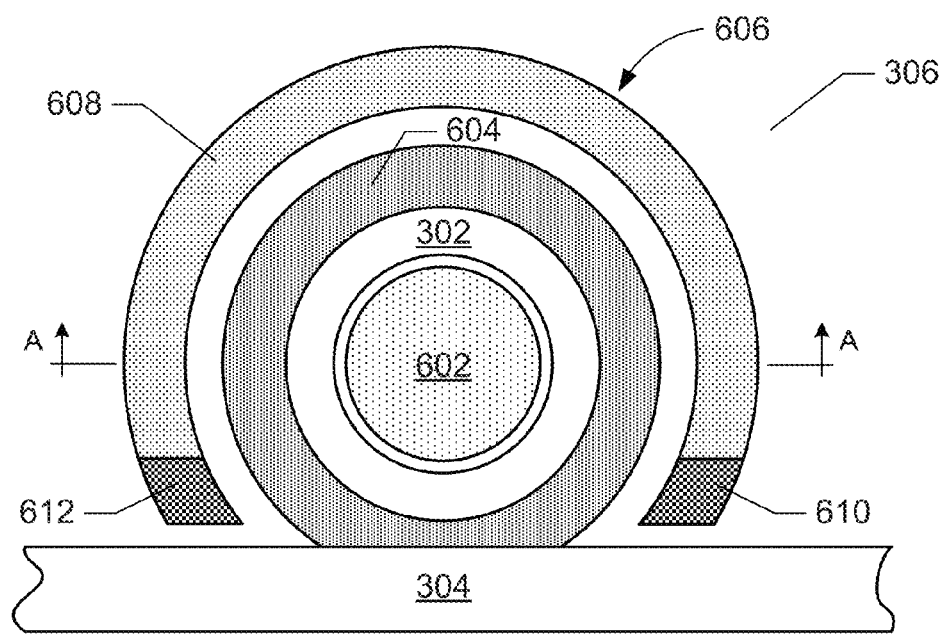
FIG. 6 shows a schematic representation of a resonator and waveguide.

FIG. 6 shows a top plan view of the resonator 302 and waveguide 304. Resonator 302 can be composed of a wide variety of different semiconductor materials. For example, the resonator 302 can be composed of an elemental semiconductor, such as Si and germanium ("Ge"), or a III-V compound semiconductor, where Roman numerals III and V represent elements in the IIIa and Va columns of the Periodic Table of the Elements. Compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The resonator 302 can be configured for electronic tuning by doping regions of the substrate 306 surrounding the resonator 302 and waveguide 304 with appropriate p-type and n-type impurities. In certain examples, the resonator 302 comprises an intrinsic semiconductor ring 302, an n-type region 602 can be formed in the semiconductor substrate interior of the ring 302, and a p-type region 604 can be formed in the substrate 306 surrounding the outside of the ring 302. The ring 302, the p-type region 304, and the n-type region 604 form a p-i-n junction. In other examples, the p-type and n-type impurities of the regions 602 and 604 can be reversed. P-type impurities can be atoms that introduce vacant electronic energy levels called "holes" to the electronic, band gaps of the core 404. These impurities are also called "electron acceptors." N-type impurities can be atoms that introduce filled electronic energy levels to the electronic band gap of the core 404. These impurities are called "electron donors." For example, boron ("B"), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities.

The p-i-n junction formed by the resonator 302 and the regions 602 and 604 can be operated in forward- or reverse-bias mode. Under a forward bias, a change in the index of refraction of the microring 302 is induced through current injection. Under a reverse bias, a high electrical field can be formed across the ring 302 and a refractive index change can result from the electro-optic effect. Both of these electronic tuning techniques provide only a relatively small shift in the effective refractive index or the resonator 302.

In the example of FIG. 6, for thermal tuning, a heating element 606 comprises a resistive region 608 that partially surrounds the region 604 and electrical contacts 610 and 612 located at the ends of the region 608. The region 608 can be composed of materials that through the process of Joule heating convert electrical current supplied via a variable current control into heat. In certain examples, the region 608 can be composed of a p-type semiconductor or an n-type semiconductor, and the contacts 610 and 612 can be composed of a metal, such as gold, silver, platinum, copper, or another suitable conductor. In other examples, the contacts 610 and 612 can be eliminated and the region 608 can be composed of platinum, nichrome, silicon carbide, molybdenum disilicide, or another suitable metal or alloy that through resistance convert electrical current into heat.

Figure 7A:
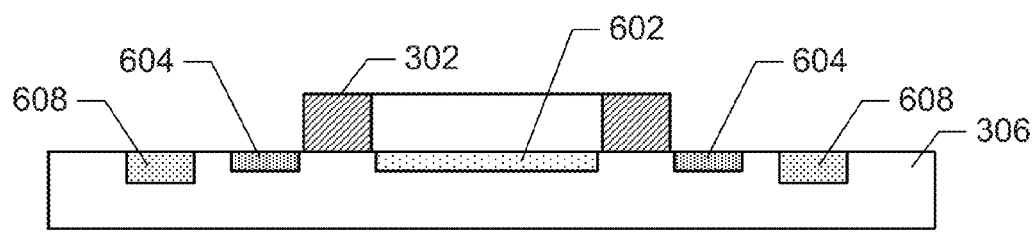
FIGS. 7A-7B show cross-sectional views of the resonator, shown in FIG. 6 along a line A-A.
Figure 7B:
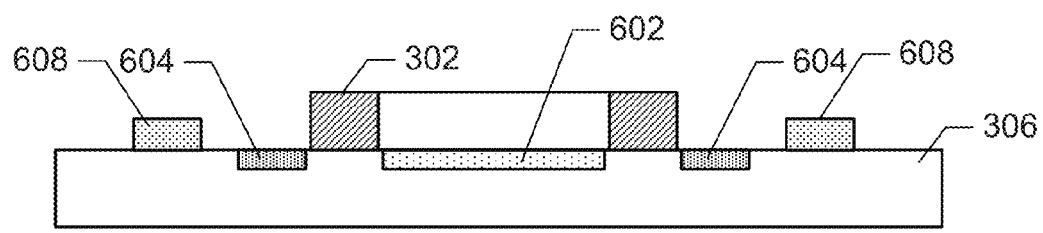

In certain examples, the heating element can be formed within the substrate 306 or the heating element can be disposed on the surface of the substrate 306. FIG. 7A shows a first cross-sectional view of the resonator 302 shown in FIG. 6 along a line A-A. FIG. 7A reveals the doped regions 602 and 604 used for electronic tuning embedded within the substrate 306, and the region 608 used for thermal tuning embedded with the substrate 306. In other examples, the heating element can be formed on the surface of the substrate 306. FIG. 7B shows a second cross-sectional view of the resonator 302 shown in FIG. 6 along the same line A-A. FIG. 7B also shows the doped regions 602 and 604 used for electronic tuning embedded within the substrate 306, but in this example, the region 608 used for thermal tuning is disposed on the surface of the substrate 306.

Figure 8:
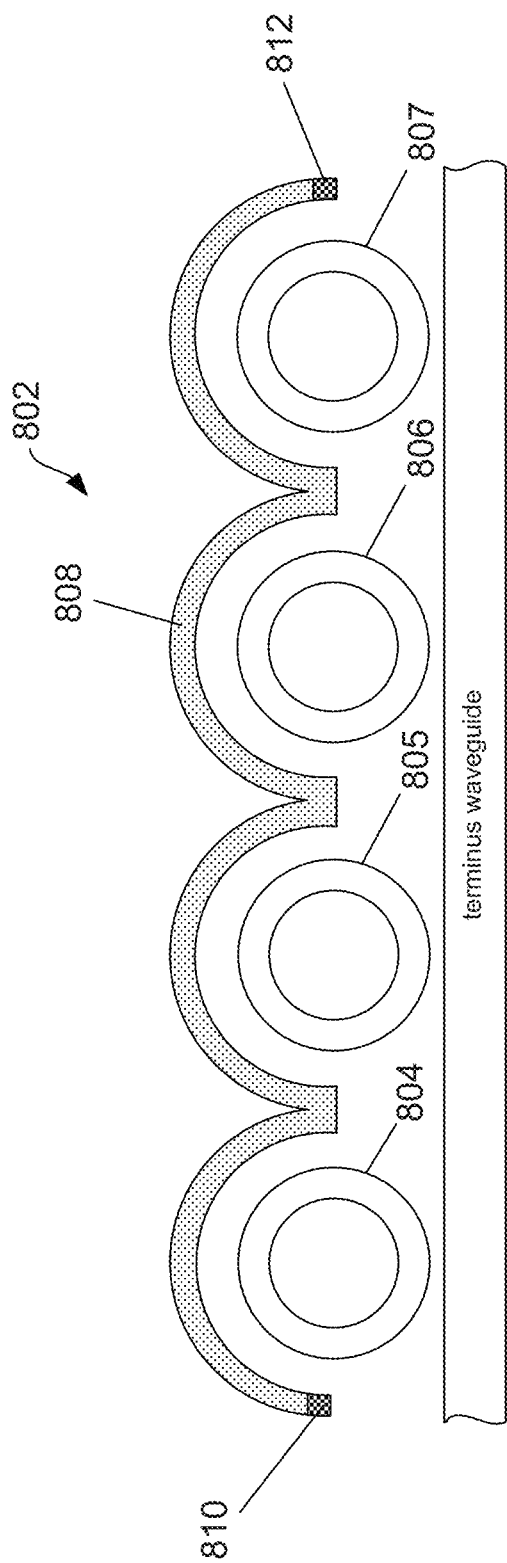
FIG. 8 shows a schematic representation of an example heating element configured to provide thermal tuning for four resonators of a modulator array.

The heating element 606 represented in FIGS. 6-7 provides thermal tuning for individual resonators. Examples disclosed herein are not so limited. In other examples, the heating element can be expanded to provide thermal tuning of two or more resonators within a modulator array. FIG. 8 shows a top plan view of an example single heating element 802 configured to provide thermal tuning for four resonators 804-807 of a modulator array. Note the p-type and n-type regions surrounding the resonators 804-807 are not shown. The heating element 802 includes a resistive region 808 configured to partially surround each of the resonators 804-807 and includes electrical contacts 810 and 812. The region 808 can be composed of a p-type or n-type semiconductor, and the contacts 810 and 812 can be composed of a metal, as described above with reference to FIG. 6. In other examples, the heating element 802 can be composed of single metal or metal alloy as described above with reference to FIG. 6. In certain examples, the heating element 802 can be formed within the substrate, as described above with reference to FIG. 7A. In other examples, the heating element 802 can be disposed on the surface of a substrate, as described above with reference to FIG. 7B.

Electronic tuning provides relatively higher speed changes in the effective refractive index of the resonator 302 than thermal tuning. For example, electronic tuning can be accomplished on the microsecond and nanosecond time scales, while thermal tuning can take place on the sub-millisecond or even millisecond time scale. Thus, electronic tuning is suitable for coding information or data in modulated channels as described above with reference to FIG. 2. However, electronic tuning can only tune a resonator over a relatively limited range of wavelengths, on the order of several nanometers. In order to adjust for inaccuracies in the fabrication of resonators or temperature changes tuning over a wavelength range of at least 10-20 nm is desirable. Thus, electronic tuning cannot be effectively used. On the other hand, thermal tuning can be used to account for inaccuracies in the fabrication of resonators or environmental temperature changes and offers the possibility of a greater resonance wavelength tuning range than electronic tuning, although at somewhat slower speeds.

Returning to FIG. 2, the channel source 226 and resonators of the modulator arrays 244-217 can be implemented in a variety of different ways, which are now described with reference to FIGS. 9-14.

Figure 9:
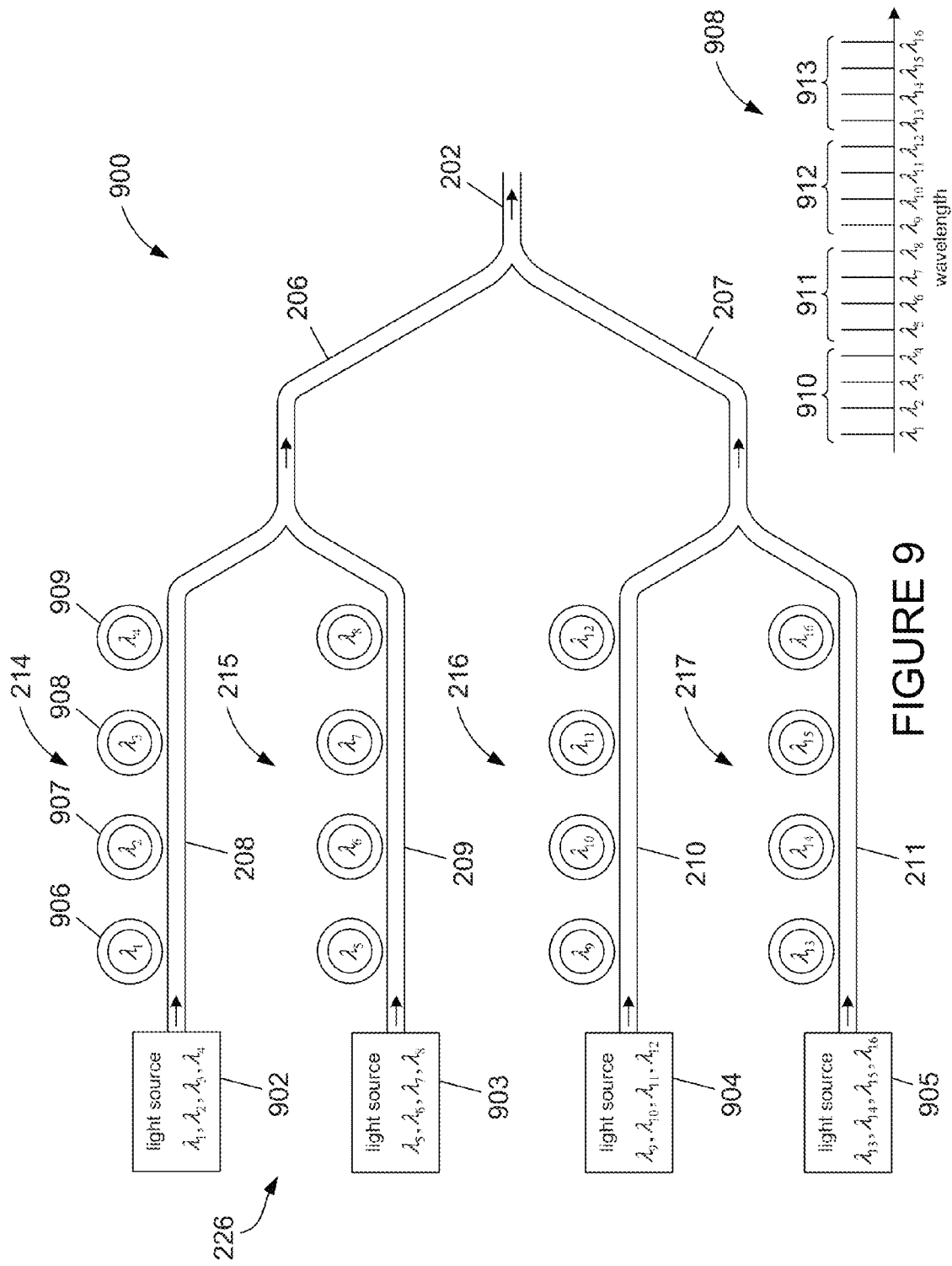
FIG. 9 shows a schematic representation of an example second modulation and wavelength division multiplexing system.

FIG. 9 shows an example modulation and WDM system 900. The system 900 includes the root waveguide 202, branching waveguides 206-211 and modulator arrays 214-217, however, the channel source 226 is composed of four separate light sources 902-905 coupled to the ends of the terminus waveguides 208-211, respectively. The light sources 902-905 can be comb lasers that are configured to collectively generate 16 different channels, each channel associated with a particular resonator. FIG. 9 includes a spectrum 908 with vertical line segments representing 16 different wavelengths arranged from the shortest wavelength 2, to the longest wavelength $\lambda_{16}$. Each wavelength in the spectrum 908 is associated with one of the channels generated by the four light sources 902-905. Each light source is configured to generate four channels consecutively ordered wavelengths and inject the wavelengths into a coupled terminus waveguide. For example, the light source 902 generates four channel consecutively ordered wavelengths 910 denoted by $\lambda_1$, $\lambda_2$, $\lambda_3$, and $\lambda_4$; the light source 903 generates four channels with consecutively ordered wavelengths 911 denoted by $\lambda_5$, $\lambda_6$, $\lambda_7$, and $\lambda_8$; the light source 904 generates four channels with consecutively ordered wavelengths 912 denoted by $\lambda_9$, $\lambda_{10}$, $\lambda_{11}$, and $\lambda_{12}$; and the light source 905 generates four channels with consecutively ordered wavelengths 913 denoted by $\lambda_{13}$, $\lambda_{14}$, $\lambda_{15}$, and $\lambda_{16}$. The resonators of the corresponding modulator arrays are each configured to modulate one of the four channels and, as shown in FIG. 9, are each labeled with the wavelength the resonator is configured to modulate. The resonators of the modulator arrays 214-217 are each labeled with the wavelength of the channel the resonator is configured to modulate. For example, the resonators 906-909 are configured to modulate the channel wavelengths $\lambda_1$, $\lambda_2$, $\lambda_3$, and $\lambda_4$.

For certain channel sources 226, the channels may be generated with some degree of channel overlap. As a result, two resonators of the same modulator array may inadvertently modulate more than one channel in a process called crosstalk. In order to prevent a modulator from modulating more than one channel, the resonance wavelengths of the resonators and the corresponding wavelengths associated with the channels must have sufficient channel spacing. For example, if the channels associated with the wavelengths $\lambda_1$ and $\lambda_2$ do not have sufficient channel spacing, the resonator 906 may inadvertently modulate the channel associated with the wavelength $\lambda_2$ and the resonator 907 may inadvertently modulate the channel associated with the wavelength $\lambda_1$. In order to increase channel spacing and avoid crosstalk, system examples include arranging the resonators of the modulator arrays and configuring the channel source so that channels associated with wavelengths in the spectrum 908 are interleaved or spread across different modulator arrays instead of grouped together.

Figure 10A:
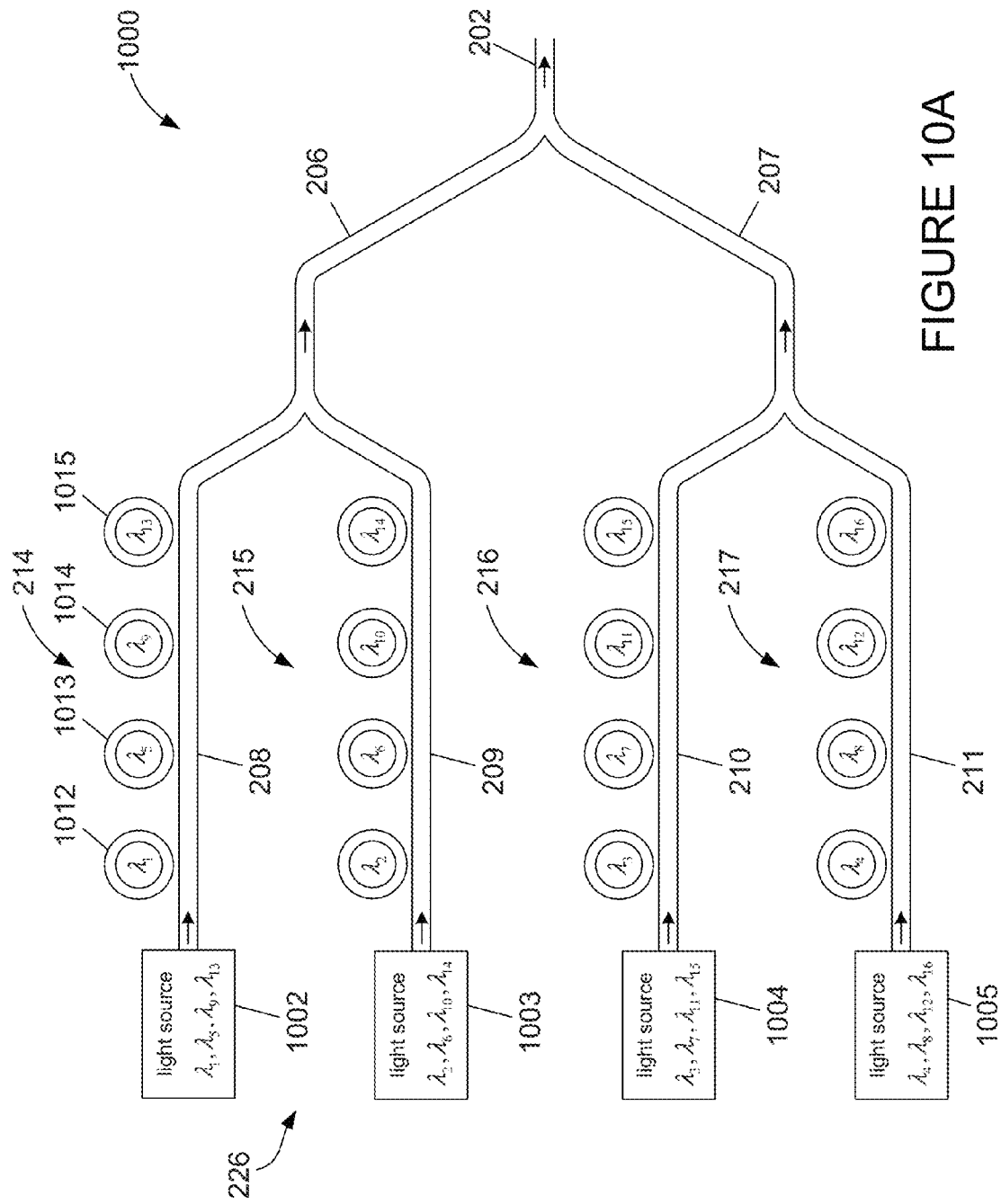
FIGS. 10A-10B show a schematic representation of an example third modulation and wavelength division multiplexing system.
Figure 10B:
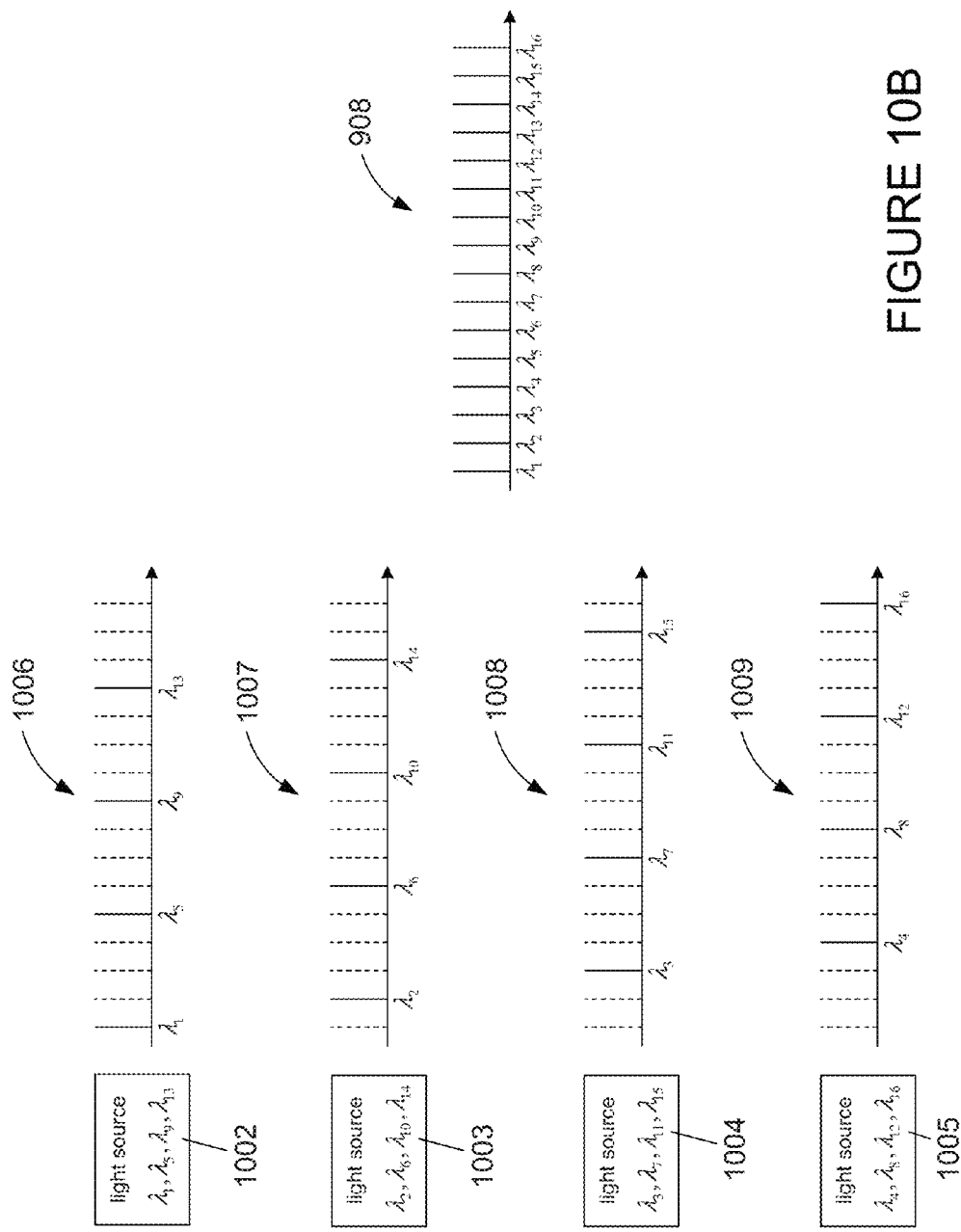

FIGS. 10A-10B show a schematic representation of an example modulation and WDM system 1000. In the example of FIG. 10A, the system 1000 is similar to the system 900, but with the light sources 902-905 of the system 901) replaced by the light sources 1002-1005 and the resonators of the modulator arrays redistributed. The light sources 1002-1005 can be separate comb lasers configured to generate light represented in the spectra of FIG. 10B. FIG. 10B shows sub-spectra 1006-1009 of the spectrum 908 of channel wavelengths, each sub-spectrum generated by an associated light source. For example, sub-spectrum 1006 represents the channel wavelengths generated by the light source 1002. In particular, vertical dashed lines in the sub-spectrum 1006 represent wavelengths in the spectrum 908 not generated by the light source 1002 and solid vertical lines represent the channel wavelengths $\lambda_1$, $\lambda_5$, $\lambda_9$, and $\lambda_{13}$ in the spectrum 908 generated by the light source 1002. Returning to FIG. 10A, the resonators of the modulator arrays 214-217 are configured to have resonance with the channels generated by the corresponding light sources. For example, the resonators 1012-1015 of the modulator array 214 are configured to modulate the channels generated by the light source 1002.

Figure 11:
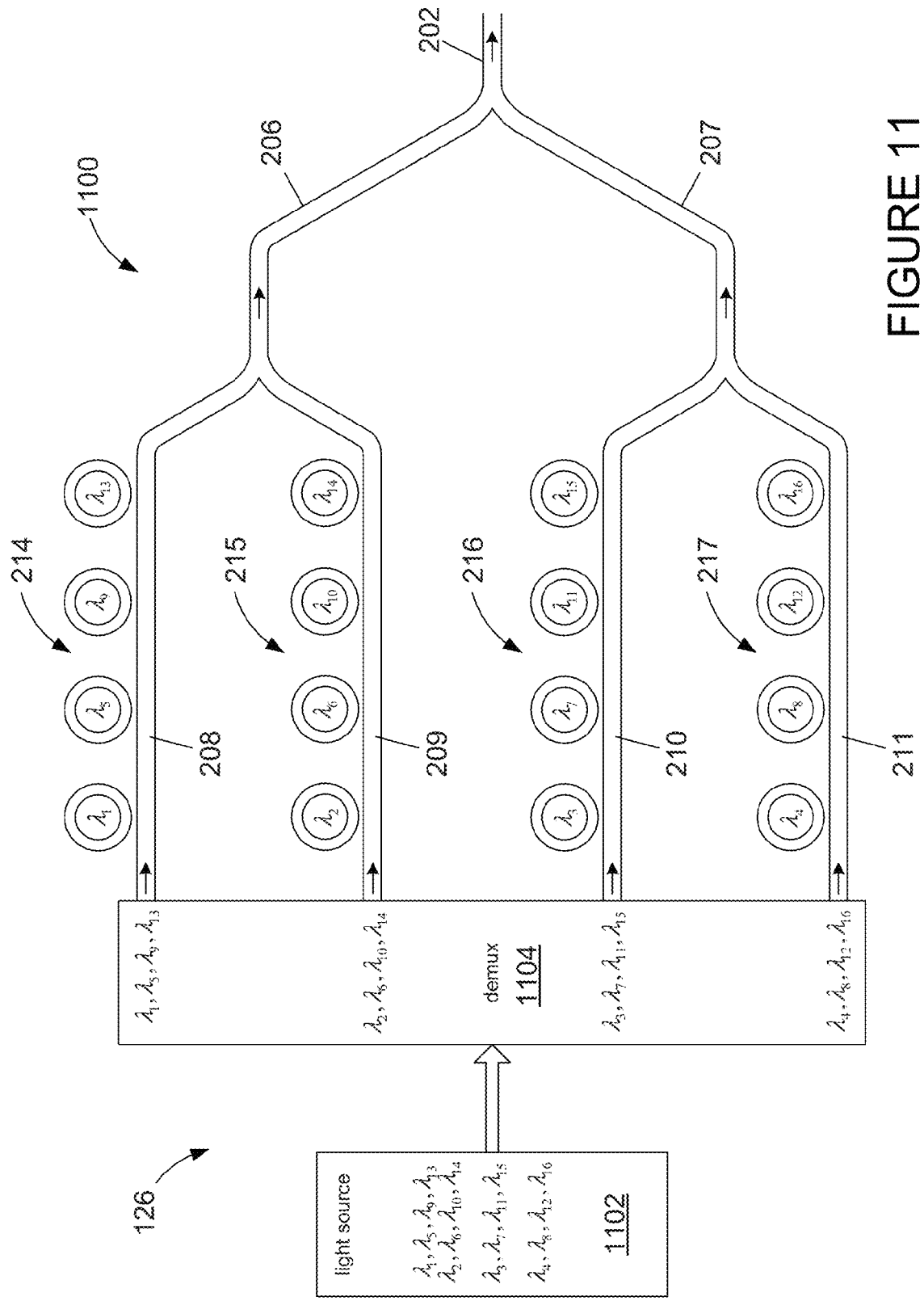
FIG. 11 shows a schematic representation of an example fourth modulation and wavelength division multiplexing system.

In other examples, the channel source of a modulation and WDM system can be composed of a single light source and a wavelength demultiplexer. FIG. 11 shows a schematic representation of an example modulation and WDM system 1100. The configuration of the system 1100 waveguides and modulator arrays is similar to that of the system 1000 except the four separate light sources 1002-1005 have been replaced by a single light source 1102 and a demultiplexer 1104. The light source 1102 can be a comb laser configured to generate each of the 16 different channels with wavelengths represented in the spectrum 908. The channels generated by the light source 1102 are injected into the demultiplexer 1104, which is configured to direct the channels to the appropriate terminus waveguides 208-211. For example, the demultiplexer 1104 receives the channels $\lambda_1, \ldots, \lambda_{16}$ from the light source 1102 and directs the channels $\lambda_1$, $\lambda_5$, $\lambda_9$, and $\lambda_{13}$ to the terminus waveguides 209; directs the channels $\lambda_3$, $\lambda_7$, $\lambda_{11}$, and $\lambda_{14}$ to the terminus waveguide 209; directs the channels $\lambda_3$, $\lambda_7$, $\lambda_{11}$, and $\lambda_{15}$ to the terminus waveguide 210; and directs the channels $\lambda_4$, $\lambda_8$, $\lambda_{12}$ and $\lambda_{16}$ to the terminus waveguide 211.

Figure 12:
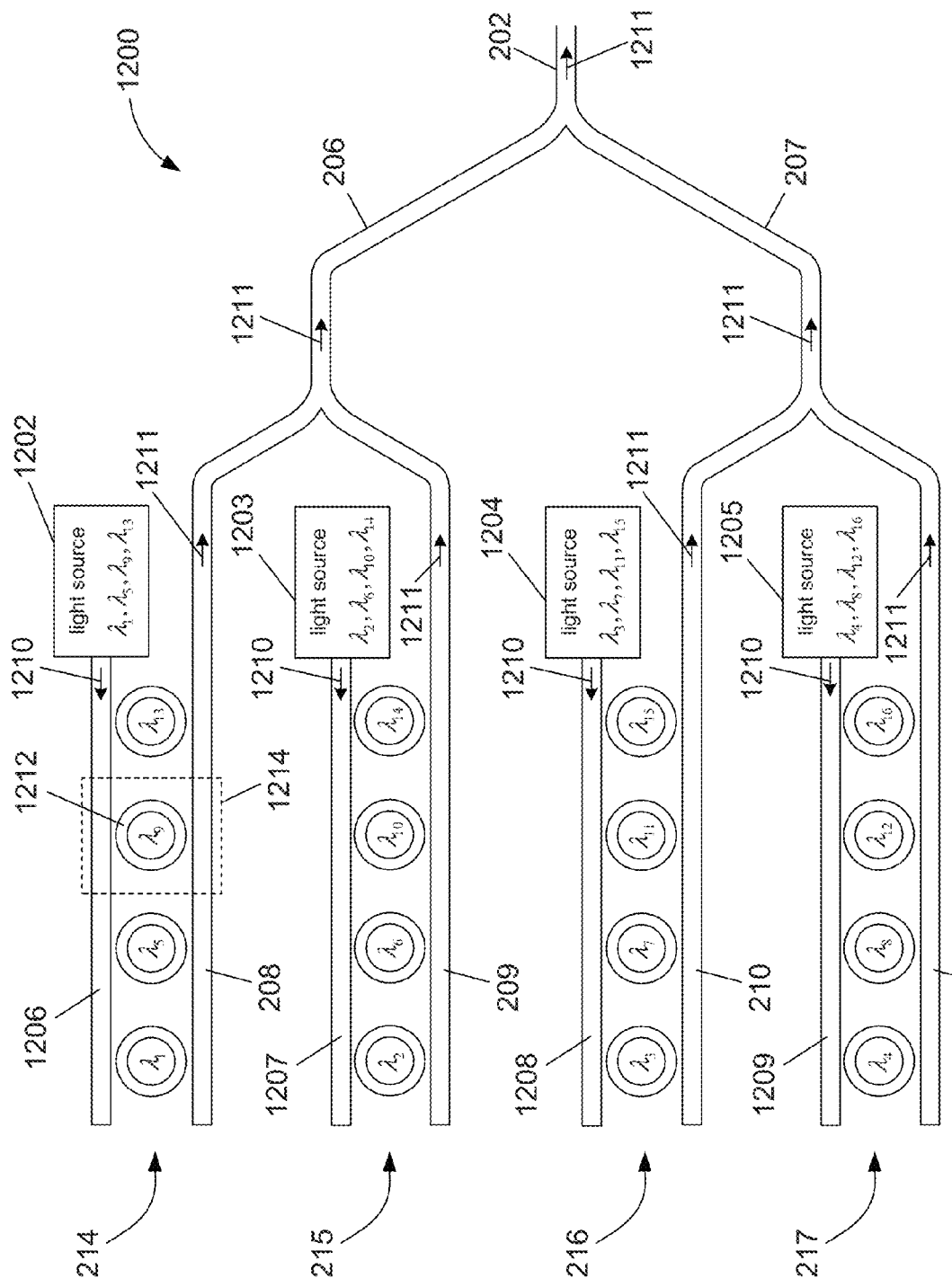
FIG. 12 shows a schematic representation of an example fifth modulation and wavelength division multiplexing system.

In other examples, the channel source of a modulation and WDM system can be composed of separate light sources and corresponding waveguide segments. FIG. 12 shows a schematic representation of an example modulation and WDM system 1200. The configuration of the system 1200 waveguides and modulator arrays is similar to that of the system 1000 except the four separate light sources 1002-1005 have been replaced by light sources 1202-1205 coupled to corresponding waveguide segments 1206-1209. The waveguide segments 1206-1209 are disposed on the substrate adjacent to resonators of the modulator arrays 214-217, and the light sources 1202-1205 are comb lasers configured to generate channels that correspond to the channels of the light sources 1002-1005. As shown in the example of FIG. 12, each light source is configured to inject channels into a coupled waveguide segment. The channels all propagate in a first direction, as indicated by directional arrows 1210. Each resonator is operated to generate an optical signal by coupling portions of a corresponding channel into a terminus waveguide. The optical signals propagate along the branching waveguides to the root waveguide 202 in a second direction opposite the first direction, as indicated by directional arrows 1211.

Figure 13:
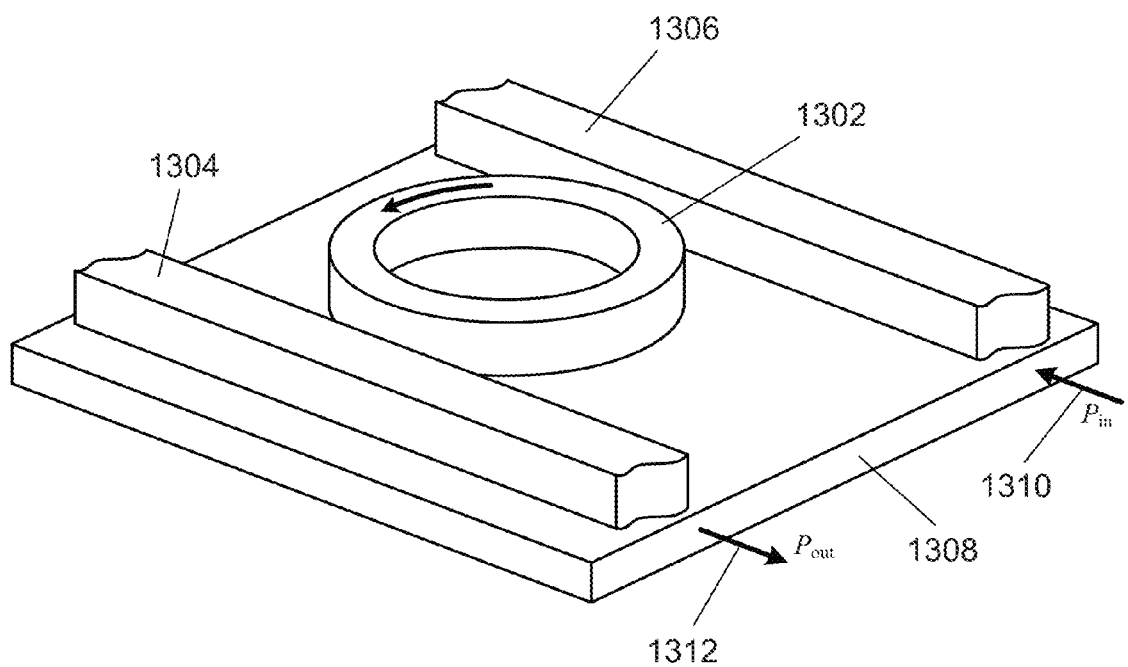
FIG. 13 shows an isometric view and enlargement of an example microring resonator disposed between a first adjacent ridge waveguide and a second ridge waveguide.

FIG. 13 shows an isometric view and enlargement of an example mirroring resonator 1302 and a portion of a first adjacent ridge waveguide 1304 and a portion of a second ridge waveguide 1306 disposed on the surface of a substrate 1308. For example, the resonator 1302 and waveguides 1304 and 1306 can represent the resonator 1212 and portions of terminus waveguides 208 and 1206, respectively, identified by enclosure 1214 shown in FIG. 12. The resonator 1302 can be configured to satisfy the resonance conditioned described above with reference to FIG. 3. In particular, when the resonator 1302 is resonant with a wavelength of light propagating in the waveguide 1306 in a first direction 1310, the light is evanescently coupled into the resonator 1302, and evanescently coupled from the resonator 1302 into the waveguide 1304, where the light propagates in a second direction 1312. The second direction 1312 is opposite the first direction 1310.

Figure 14:
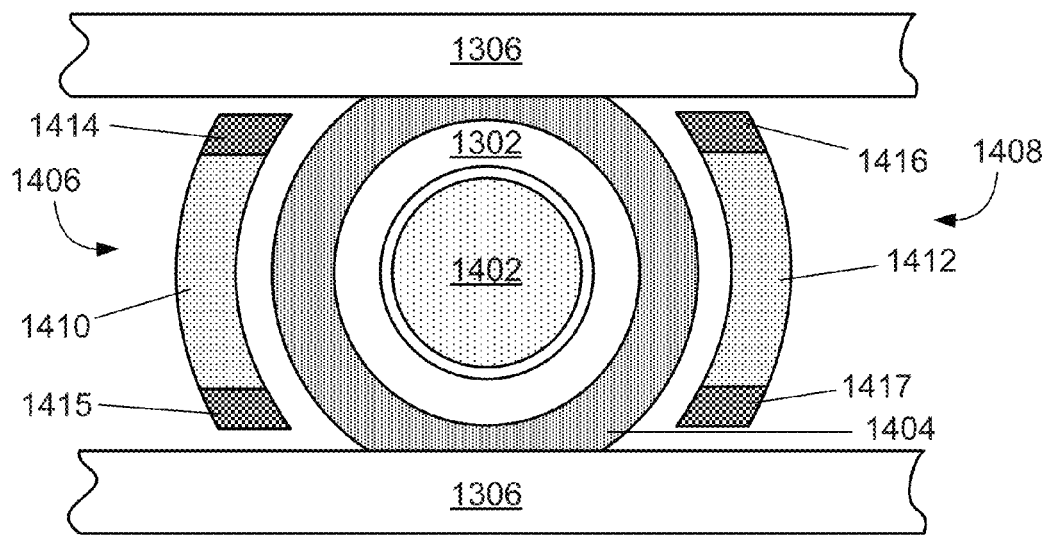
FIG. 14 shows a schematic representation of the resonator and waveguides shown in FIG. 13.

The resonator 1302 can be configured for electronic tuning and thermal tuning, as described above with reference to FIGS. 3-7. FIG. 14 shows a top plan view of the resonator 1302 and waveguides 1304 and 1306. For electronic tuning, the resonator 1302 can be configured as a p-i-n junction with the resonator 1302 comprising an intrinsic semiconductor, an n-type region 1402 formed within the substrate 1308 interior of the resonator 1302, and a p-type region 1404 formed in the substrate 1308 surrounding the outside of the resonator 1302. In other examples, the n-type and p-type impurities can be reversed. For thermal tuning, one or more heating elements 1406 and 1408 partially surrounding the region 1404 can be included. The heating elements 1406 and 1408 are composed of corresponding resistive regions 1410 and 1412 composed of materials that through the process of Joule heating convert electrical current supplied via a variable current control into heat. In certain examples, the resistive regions 1410 and 1412 can be composed of p-type, or n-type, semiconductor materials and include pairs of electrical contacts 1414 and 1415 associated with element 1406 and include pairs of electrical contacts 1416 and 1417 associated with the element 1408. In other examples, the contacts can be eliminated and the resistive regions 1410 and 1412 can be composed of platinum, nichrome, silicon carbide, molybdenum disilicide, or other suitable metals and alloys that through resistance convert electrical current into heat.

Returning to FIG. 12, optical signals can be produced by operating each resonator to couple light associated with a particular wavelength from a waveguide segment into a terminus waveguide. For example, an electronic signal encoding, binary information in high and low voltages can be applied to the resonator 1212. A high voltage can represent the logic binary value "1," and a low or no voltage can represent the logic binary value "0," or vice versa. Suppose that when a high voltage is applied to the resonator 1212, the resonator 1212 is resonant with the channel $\lambda_9$. As a result, while the high voltage is applied, the light corresponding to the channel) $\lambda_9$ is coupled into the terminus waveguide 208. On the other hand, when a low voltage is applied to the resonator 1212 no light associated with the channel $\lambda_9$ is coupled into the terminus waveguide 208. The resulting optical signal $\overline{\lambda}_9$ is composed of high and low amplitudes with a high amplitude corresponding to a logic binary value "1" and a low or no amplitude corresponding to a logic binary value "0."

Note that modulation and WDM system examples disclosed herein are not intended to be limited to the example systems described above. For example, the resonators comprising a modulator array are not limited to being distributed along one side of terminus waveguide. In other examples, the resonators can be distributed on both sides of a terminus waveguide. In other examples, the number of resonators per modulator array can range from as few as 1 to 10 or more, and the modulator arrays are not all limited to having the same number of resonators.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope oldie invention be defined by the following claims and their equivalents:

The invention claimed is:

1. A modulation and wavelength division multiplexing system comprising:
   a waveguide tree structure disposed on a substrate, the tree structure including waveguides branching from a root waveguide, the waveguides including two or more terminus waveguides coupled to a channel source for outputting an optical signal with a plurality of wavelengths, with different wavelengths corresponding to different channels; and
   one or more modulator arrays disposed on the substrate, wherein each modulator array comprises multiple modulators, each modulator for modulating a different wavelength in an optical signal, and where each modulator array is optically coupled to one of the terminus waveguides to modulate channels injected into that terminus waveguide;
   wherein modulated optical signals propagate from any terminus waveguide along one or more of the waveguides to the root waveguide.

2. The system of claim 1, wherein the channel source further comprises one or more light sources, each light source coupled to one of the terminus waveguides and configured to generate a subset of the channels.

3. The system of claim 2, wherein each subset of the channels further comprises channels having consecutive wavelengths.

4. The system of claim 2, wherein the subsets of the channels further comprise interleaved wavelengths.

5. The system of claim 1, wherein the channel source further comprises:
   a light source configured to generate the channels; and
   a demultiplexer coupled to the one or more terminus waveguides, wherein the demultiplexer receives the channels from the light source and distributes each subset of channel to a corresponding terminus waveguide.

6. The system of claim 1, wherein the channel source further comprises:
one or more light sources; and
one or more waveguide segments, wherein each waveguide segment is coupled to one of the one or more light sources and is optically coupled to one of the one or more modulator arrays.

7. The system of claim 1, wherein the waveguide tree structure further comprises ridge waveguides.

8. They system of claim 1, wherein each of the one or more modulator arrays operated independently of whether the resonance wavelengths associated with the other modulator arrays are actively maintained.

9. The system of claim 1, wherein each modulator array further comprises one or more microring resonators, each microring configured to have a tunable resonance with one of the channels.

10. The system of claim 9, wherein each microring configured to have a tunable resonance further comprises:
the microring composed of an intrinsic material located adjacent to a terminus waveguide; and
a first doped region formed in the substrate interior of the microring; and
a second doped region formed in the substrate surrounding the microring, wherein the first doped region includes a p-type dopant and the second doped region includes a n-type dopant, or the first doped region includes a n-type dopant and the second doped region includes a p-type dopant.

11. The system of claim 9, wherein each microring configured to have a tunable resonance further comprises a heating element located in proximity to the microring, the heating element enabling the microring to be inactivated when the microring is not in use.

12. A system comprising:
a modulation and wavelength division multiplexing system including:
a channel source for outputting multiple wavelengths;
a waveguide tree structure configured with waveguides branching from a root waveguide, the waveguides including two or more terminus waveguides, wherein each terminus waveguide is arranged to receive said multiple wavelengths from said channel source; and
one or more modulator arrays each comprising a plurality of optical modulators, wherein each modulator array is optically coupled to one of the two or more terminus waveguides and is configured to encode data generated by a computing device into optical signals that propagate from the channel source through the terminus waveguide to the root waveguide.

13. They system of claim 12, wherein each of the one or more modulator arrays is operated independently of whether resonance wavelengths associated with the other modulator arrays are actively maintained.

14. A system comprising:
a modulation and wavelength division multiplexing system including:
a waveguide tree structure configured with waveguides branching from a root waveguide, the waveguides including two or more terminus waveguides;
one or more modulator arrays disposed on the substrate, wherein each modulator array is optically coupled to one of the two or more terminus waveguides and is configured to encode data generated by a computing device into optical signals that propagate from the channel source through the terminus waveguide to the root waveguide; and
a channel source configured to generate channels, wherein a different subset of the channels is injected into each of the terminus waveguides, wherein each modulator array encodes the data in the optical signals by modulating the subset of channels injected into the corresponding optically coupled terminus waveguide.

15. The system of claim 14, wherein the channel source further comprises multiple light sources, each light source coupled to at least one of the one or more terminus waveguides.

16. The system of claim 12, wherein the channel source further comprises:
a light source configured to generate multiple channels corresponding to said multiple wavelengths; and
a demultiplexer coupled to the one or more terminus waveguides, wherein the demultiplexer receives the channels from the light source and distributes a subset of channels to a corresponding terminus waveguide.

17. The system of claim 12, wherein the channel source further comprises:
one or more light sources; and
one or more waveguide segments, wherein each waveguide segment is coupled to one of the one or more light sources and is optically coupled to one of the one or more modulator arrays.

18. The system of claim 12, wherein each modulator array further comprises one or more microring resonators, each microring configured to have a tunable resonance with a channel.

19. The system of claim 18, wherein each microring configured to have a tunable resonance further comprises:
the microring composed of an intrinsic material located adjacent to a terminus waveguide; and
a first doped region formed in the substrate interior of the microring; and
a second doped region formed in the substrate surrounding the microring, wherein the first doped region includes a p-type dopant and the second doped region includes a n-type dopant, or the first doped region includes a n-type dopant and the second doped region includes a p-type dopant.

20. The system of claim 18, wherein each microring configured to have a tunable resonance further comprises a heating element located in proximity to the microring, the heating element enabling the microring to be inactivated when the microring is not in use.

* * * * *

UNITED STATES PATENT AND TRADEMARK OFFICE
CERTIFICATE OF CORRECTION

PATENT NO. : 8,705,972 B2  
APPLICATION NO. : 12/777500  
DATED : April 22, 2014  
INVENTOR(S) : Moray McLaren et al.

Page 1 of 1

It is certified that error appears in the above-identified patent and that said Letters Patent is hereby corrected as shown below:

On the title page, Item (75), Inventors, in column 1, line 4, delete "Florentino," and insert -- Fiorentino, --, therefor.

In the Claims

In column 13, line 10, in Claim 8, delete "They" and insert -- The --, therefor.

In column 13, line 51, in Claim 13, delete "They" and insert -- The --, therefor.

Signed and Sealed this
Fourteenth Day of October, 2014

Michelle K. Lee
*Deputy Director of the United States Patent and Trademark Office*